United States Patent [19]

Fletcher et al.

[11] Patent Number: 5,012,409
[45] Date of Patent: Apr. 30, 1991

[54] OPERATING SYSTEM FOR A MULTI-TASKING OPERATING ENVIRONMENT

[76] Inventors: Mitchell S. Fletcher, 17432 N. 60th Dr., Glendale, Ariz. 85308; Richard P. Semma, 8501 E. Lee Pl., Tucson, Ariz. 85715

[21] Appl. No.: 166,334

[22] Filed: Mar. 10, 1988

[51] Int. Cl.$^5$ .......................... G06F 9/00; G06F 9/46
[52] U.S. Cl. ..................... 364/200; 364/230; 364/230.3
[58] Field of Search ... 364/200 MS File, 900 MS File

[56] References Cited

U.S. PATENT DOCUMENTS

| | | | |
|---|---|---|---|
| 3,618,045 | 11/1971 | Campbell | 364/200 |
| 3,643,227 | 2/1972 | Smith | 364/200 |
| 4,001,783 | 1/1977 | Monahan | 364/200 |
| 4,047,161 | 9/1977 | Davis | 364/200 |
| 4,084,228 | 4/1978 | Durfond | 364/200 |
| 4,228,495 | 10/1980 | Bernhard | 364/200 |

Primary Examiner—David Y. Eng
Attorney, Agent, or Firm—George A. Leone, Sr.

[57] ABSTRACT

A task scheduler system including an array of priority queues for use in a real time multitasking operating system including equation lists, configuration lists, a function library, input and output drivers, user-created task definition lists of major and minor tasks and interrupt handlers. The system includes task scheduling apparatus which, upon the completion of each library function, interrogates the priority queues and finds the highest priority task segment whose requested resource is available and executed, and which executes task segments in the same priority queue in round-robin fashion. The system further includes task creation apparatus and apparatus for maintaining the status of all major tasks in a system in the states of unlocked and done, unlocked and active, unlocked and waiting, locked and active, or locked and waiting. The status maintaining apparatus also includes apparatus for locking tasks into a mode of operation such that the task scheduler will only allow the locked task to execute and the normal state of priority execution is overridden, and waiting apparatus for suspending operation on a task that requires completion of a library function.

5 Claims, 8 Drawing Sheets

NOTE: SHADED PORTION IS PROVIDED BY THE USER

OPERATING SYSTEM FOR A MULTI-TASKING OPERATING ENVIRONMENT

BACKGROUND OF THE INVENTION

The present invention is directed to an Operating System (OS) and more particularly to a multitasking operating environment for multiplexer/ demultiplexer applications. The OS of the invention is configured using symbolic notation and user defined executable modules.

Figure 1:
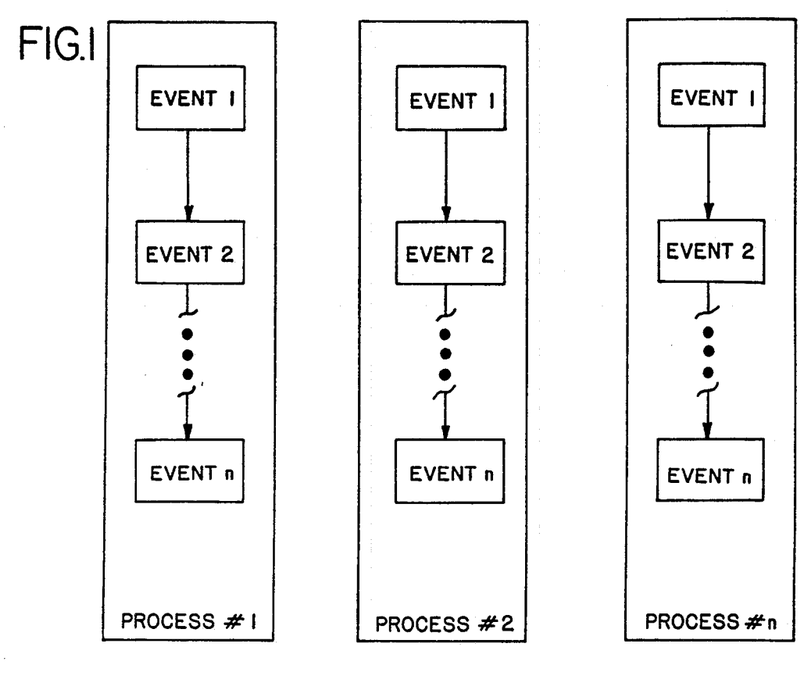
FIG. 1 illustrates a symbolic diagram of real time process functional flow.

Every real time application can be defined as distinct processes, each consisting of a sequence of events as shown in FIG. 1.0. The type of event and the time at which the event is executed is unique to the application. The OS of the invention makes use of this generalization to define and coordinate processing activities within a processor. As one skilled in the art will recognize, the OS of the invention can be extended to numerous processing architectures. For ease of describing the invention, the invention will be described in terms of an OS used for a flexible multiplexer/demultiplexer system (FMDM) called an "FVOS" herein.

FMDM architecture consists of three processors: the Central Processing Unit (CPU), and Input and Output Processor (IOP), and an Arithmetic Processing Unit (APU). The IOP and APU are intended to free the CPU from time consuming inputs, outputs, and calculations. Therefore, optimal performance is achieved if all three processors are executing events at the same time commonly known as coprocessing. FVOS achieves this in the following manner.

Table 1.0 summarizes the function library which can be thought of as general purpose instructions which, when "threaded" together in a task definition list, define a task. The function library gives the user the tools to schedule his applications in symbolic notation. The function library consists of arithmetic, input/output (I/O), task creation/termination, built-in test, application module run, and reset functions. This gives the user a good mixture of functions to define his task. A conditional jump function is also included which gives the user the ability to jump over or loop within a list based on task status or timing.

The IOP executes serial input/output functions which are hardware specific For instance, an input from hardware cannot be performed while the IOP is currently performing another serial input or output. The APU calculates the results of application specific equations. The CPU performs all other functions, delegates the execution of IOP and APU functions, and initiates coprocessing. Some functions must include an address pointer in its definition. For example, the RUN function has a pointer to the location of the application module. INPUT and OUTPUT functions have a pointer to the respective input or output buffers. A list of functions and pointers defines a task. Each task which makes up the application is defined in the same manner and then assigned a relative priority. The CPU then decodes these task lists and delegates each function to an individual processor based on priority and available resources.

The FMDM (three processor) implementation of this concept allows the capability of up to 128 task definition lists with one of eight priority levels. This is limited only by available memory and can be expanded to multiple processor systems with minimal refinement.

Figure 3:
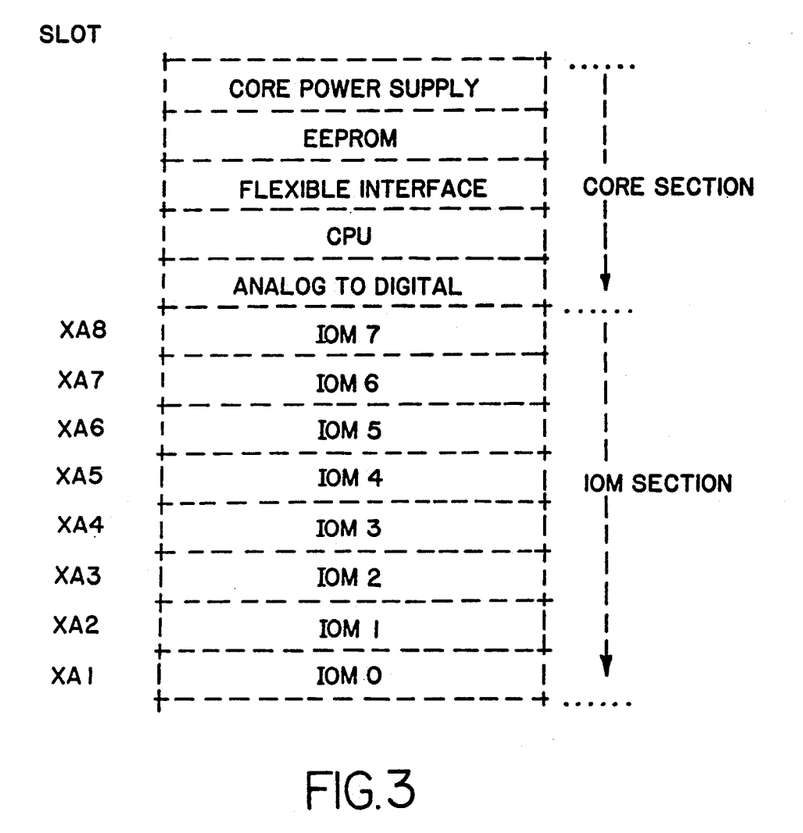
FIG. 3 schematically shows a generic example of a simplex MCU FMDM configuration.

The word "flexible" applies to many areas of FMDM design that allow for a wide variety of payload applications. Some of these applications include use as a common/response unit for tying an experiment into a computer complex which may be resident on an aircraft, for example. The FMDM can also be used for controlling data acquisition providing autonomous control and data handling. FIG. 3 shows a generic example of an FMDM configuration including a microprocessor. FVOS was designed to free the user from the burden of interrupt handling, I/O bus contention, system timing, etc., and at the same time, allow full access to FMDM resources. FVOS provides a multi-tasking environment with eight levels of priority, almost instant response to time critical events, and the ability to communicate with any of the IOM's via simple 1-line commands.

SUMMARY OF THE INVENTION

A task scheduler system including an array of priority queues for use in a real time multitasking operating system including equation lists, configuration lists, a function library, input and output drivers, user-created task definition lists of major and minor tasks and interrupt handlers is disclosed. The system includes means for task scheduling according to priority wherein upon the completion of each library function the priority queues are interrogated and the highest priority task segment is found whose requested resource is available and executed and wherein task segments in the same priority queue are executed in round-robin fashion. The system further includes means for task creation and therefore, means for maintaining the status of all major tasks in a system in the states of unlocked and done, unlocked and active, unlocked and waiting, locked and active, or locked and waiting. The status means also includes means for locking tasks into a mode of operation such that the task scheduler will only allow the locked task to execute and the normal state of priority execution is overridden and waiting means for suspending operation on a task that requires completion of a library function.

DETAILED DESCRIPTION OF THE PREFERRED EMBODIMENT

Figure 2:
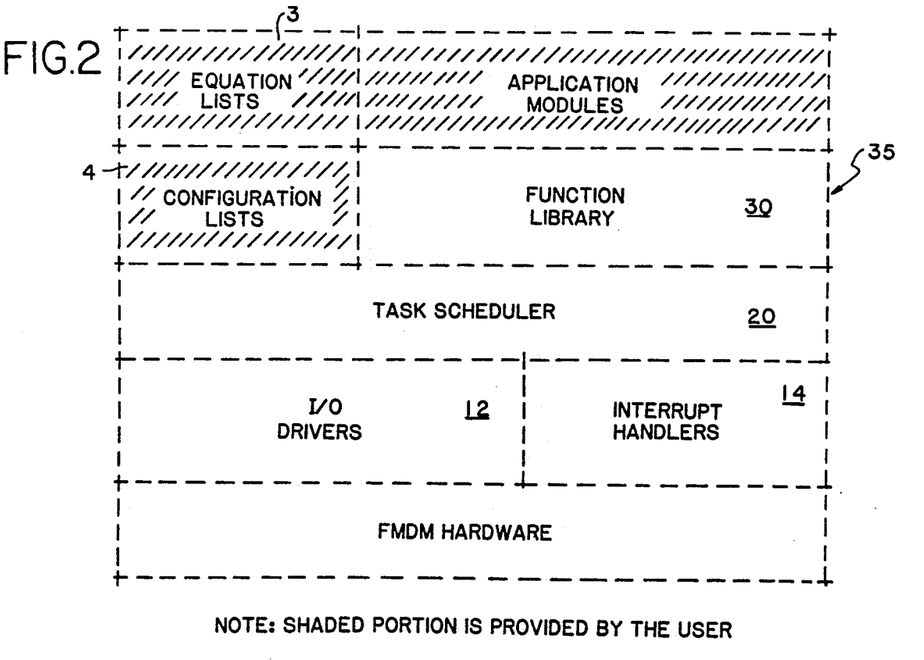
FIG. 2 shows a schematic diagram of FVOS functional structure.

The instant invention comprises a Operating System (OS) comprising three levels of software which create a multi-tasking environment for user applications. FIG. 2 is a schematic diagram of one embodiment of the invention which is an OS used in an FMDM processing system or "FVOS". As shown in FIG. 2, the first level comprises input/output (I/O) drivers 12 and interrupt handlers 14. The task creation and synchronization is implemented as one of the interrupt handlers. The next level comprises a task scheduler 20 and the last level comprises a function library 30. FVOS provides a multi-tasking operating environment for flexible multiplexer/demultiplexer (FMDM) applications and can control execution of multiple tasks and respond quickly to high priority tasks at time critical events. In one embodiment of the invention FVOS is capable of controlling execution of up to 128 tasks.

Referring again to FIG. 2, the user must supply the equation lists 3, configuration lists 4, and the application modules. These lists and modules are created using a Z80 macro assembler and the FVOS macro function library. Although it will be evident to those skilled in the art that the instant invention may be used with many types of real time control applications, such as industrial controllers, the description of the preferred embodiment as follows refers to the use of the operating system in connection with an FMDM processing system which is used in connection with monitoring and controlling multiple scientific experiments being carried out in real time and contemporaneously with each other.

The task scheduler 20 coordinates the central processing unit (CPU), arithmetic processing unit (APU), and I/O resources. On the basis of priority, the task scheduler 20 chooses the priority of execution of functions. Following the execution of each function, control returns to the task scheduler 20. Task scheduler 20 is described in further detail below.

The function library 30 consists of various elementary operations which, when organized in a sequence, form a task. Some functions use the I/O drivers, and others the APU. The only way that a function is executed is by initiation from the task scheduler 20. The equation lists, task definition lists, and application modules are not part of FVOS but are an important part of FVOS operation with regard to satisfying a particular application. Equation lists define application-specific numerical equations which shall be interpreted by the calculate function and executed by the APU. The task definition lists are application-specific lists which define the fundamental sequential operations that make up the tasks, the relative priority among neighboring tasks, and the execution frequency of each task. The task definition lists shall be interpreted by the task scheduler 20 to orchestrate the execution of functions. The application modules are linkable object code modules required for the application.

FVOS Functional Description

FVOS is based on a top-down structured definition of all tasks to be executed. Applications are defined in a structured manner and each application can be represented as one task or multiple tasks. Each task is assigned a relative priority and consists of functions from the function library, which are task segments. Execution of these task segments shall be started in series by the CPU, but will be executed in parallel by the IOP and APU.

The major functional portions of FVOS are the initialization module (not shown), the task scheduler 20, and the function library 30. A detailed break down of FVOS software modules along with their respective functions is shown at Table 2. The initialization module prepares FVOS for operation. The task scheduler 20 delegates execution of all tasks. The function library 30 contains the commands which are available to the user for defining an application and symbolic notation.

At OS Initialization

In one embodiment of the OS, called the FVOS as used with the FMDM system, the following initialization procedures are followed. Upon entry, FVOS is initialized, task zero (the first user defined task) is placed in the highest priority queue, and the task scheduler is entered. FVOS initialization consists of: (1) zero out RAM, (2) initialize all pointers, (3) set up interrupt vectors and priority memory, (4) move three pages of EEPROM into RAM, (5) set up minor and major frame timing, and (6) enable interrupt.

Task zero is initiated by placing its first function in the highest priority queue. Control is then given to the task scheduler 20 which executes task segments currently in the queues based on priority and resource availability. Other tasks are executed by their first element being added to the queue by task zero, the task creation and synchronization routine, or by special interrupt. Each task is executed as a series of task segments, one segment at a time. The task segments ready to be executed are maintained in a series of queues which are ordered with the highest priority first. When a task segment is completed, the next task segment within that major task is added to the queue and priority is reevaluated by the task scheduler to determine which task segment to execute next. Tasks of the same priority are executed in a round-robin fashion with no task suspension.

Task Scheduler

The task scheduler 20 controls execution of all tasks based on priority and resource availability, by maintaining a series of pointers, status registers, counters, and a plurality of priority queues. In the FVOS version of the instant invention, the number of levels of priority queues is 8. Following power up of the system in normal operation, the first major task is executed and is typically reserved by the user for initialization functions. The task scheduler is reentered following the execution of each task segment. The task creation and synchronization portion of the task scheduler is entered at each tick of the system clock (each 10 msec).

The task scheduler allows the CPU to execute the first task (highest priority) in the queue. If the function which a minor task segment calls is busy (e.g., waiting for data, such as completing a calculation or still in the process of serially transferring an input from or an output to an IOM), the task scheduler will proceed to the next element in the queue. This approach maximizes effective processing performance because processing resources such as scientific arithmetic computation and input/output will be executed in parallel with the CPU functions.

Figure 4:
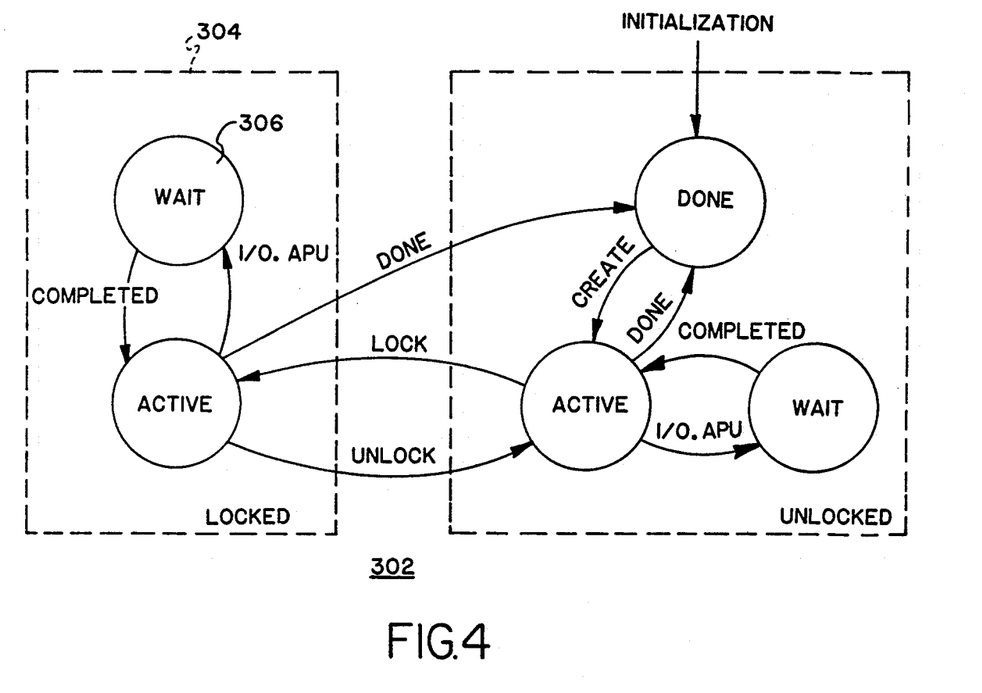
FIG. 4 illustrates the FVOS Task State diagram.

The task scheduler also includes means for maintaining the status of every major task. Major task statuses defined as follows (all other states are illegal in the system):

00 H = UNLOCKED and DONE    81 H = LOCKED and ACTIVE
01 H = UNLOCKED and ACTIVE    83 H = LOCKED and WAITING -continued 03 H = UNLOCKED and WAITING A locked task is defined as one which is in the "locked" operating mode. A done task is defined as one that is waiting to be created. A task is "created" when it is put into the priority queue for execution. An active task is defined as a task that is currently experiencing execution (i.e., has an element in the queue). A task is defined as waiting if it has initiated execution of an APU or I/O function but the function is not 100% completed. As shown in FIG. 4, all tasks are done immediately after initialization. Once a task is active locked, it is returned to the active unlocked state by executing an unlock or done function. In the locked mode 304, a task can go from active to waiting 306 and back again to active. In the unlocked mode, a task can go from active to done or waiting but cannot go from done to waiting or from waiting to done.

The task creation and synchronization portion of the task scheduler is the interrupt service routine for the programmable timer. At each tick of the system clock (every 10 msec), the FMDM Mission Elapsed Time (MET) is incremented, along with the minor and major frame timing. This time can be synchronized with Greenwich Mean Time if necessary. Tasks are created based on major or minor frame timing, a specified delay, or MET. The task scheduler maintains a list of tasks to be created at a specific minor frame, major frame, MET, or delay time. At the correct time, each element of the list is evaluated and if the element has matured, it is put in the priority queue for execution.

Function Library

The function library gives the user the tools to create his applications in symbolic notation. The function library consists of arithmetic, I/O, task creation/termination, BITE, application module RUN, memory manipulation, and RESET functions. A conditional jump function is also included which offers the ability to jump over or loop, based on task status, timing, or a user-defined flag. A task segment shall be a function with specific inputs and outputs defined in the task configuration list. A list of task segments form a task. Application modules can be written in a high-level language or assembly language and then be executed by the RUN function.

The function library can be thought of as a collection of general-purpose instructions which, when "threaded" together by the task configuration list, form a task. Each user function will be written in symbolic notation which, when expanded by a set of FVOS macros, will form the configuration list. The macro definitions shall be made to operate with a Tektronix Z80 assembler.

FVOS Functional Flow

Figure 5A:
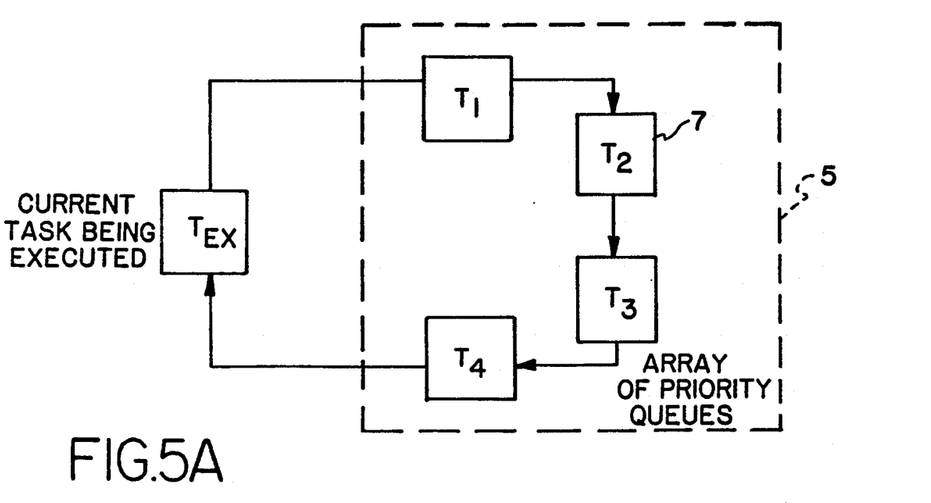
FIGS. 5(a), 5(b), and 5(c) diagrammatically illustrate the FVOS operational modes.

FVOS has three primary operational modes, as shown in FIG. 5. These tasks shall be the normal (task-to-task) operational mode, the locked operational mode, and the reserved-resources operational mode. Task-to-task operation is shown in FIG. 5(a) as the normal operational mode. The highest priority task is executed and the other tasks T1-T4, generally designated 7, remain in a queue waiting for their turn. FIG. 5(a) shows an array of priority queues 5. In the FVOS embodiment of the present invention, 8 queues contain the address pointers and priority status for 8 subtasks, also called elements. Tasks of the same priority are executed in a round-robin fashion with no task suspension. After the current task has been executed, priority is reevaluated and the highest priority task is executed.

Still referring to FIG. 5(a), for example, the current task being executed is represented by the box labelled $T_{ex}$, once that task is executed, the task scheduler again reviews the priority queues searching for the next task of the highest priority. Assuming that the task of the highest priority is task T1, this would be the next task executed. If tasks T1, T2, T3, and T4 are all the same priority, task T1 would be executed first, T2 second et. seq., since the task would then be taken in a round-robin fashion.

Locked Operational Mode

Figure 5B:
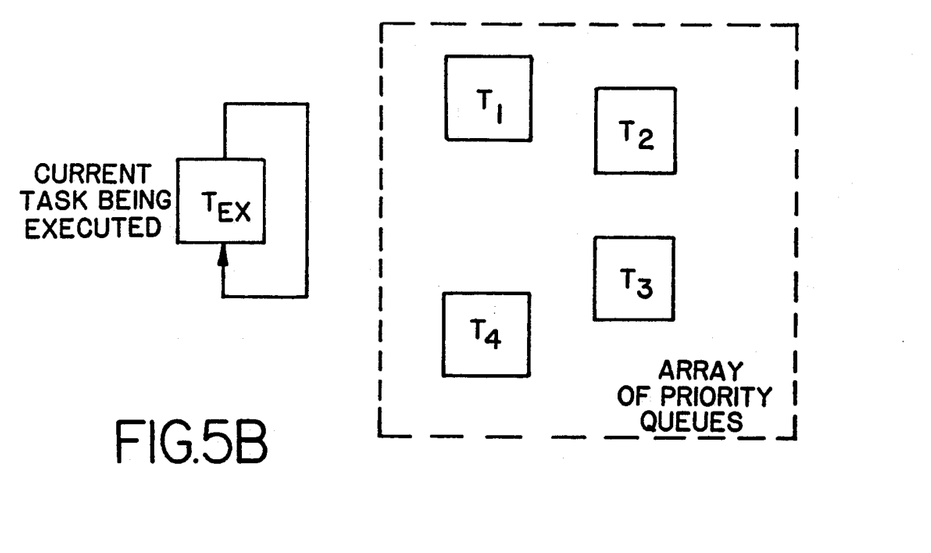

Referring now to FIG. 5(b), a symbolic diagram of the locked operational mode is shown. Locked operation mode is scheduled when a sequence of events within a major task is time critical. As noted above, a major task is a series of subtasks which is to be completed within a major time frame. As shown in FIG. 5(b) by the box labelled $T_x$, a locked task overrides normal priority and has all resources available to it. The locked task is executed function after function without evaluating the queue until a "done" or "unlock" function is encountered. The done or unlock functions would be executed as subtasks within the major task. A task is "done" when all subtasks have been executed. The "done" function tells the task scheduler to stop working on that task. FVOS then returns to normal task to task operational mode as shown in FIG. 5(a).

Reserved-Resources Operational Mode

Figure 5C:
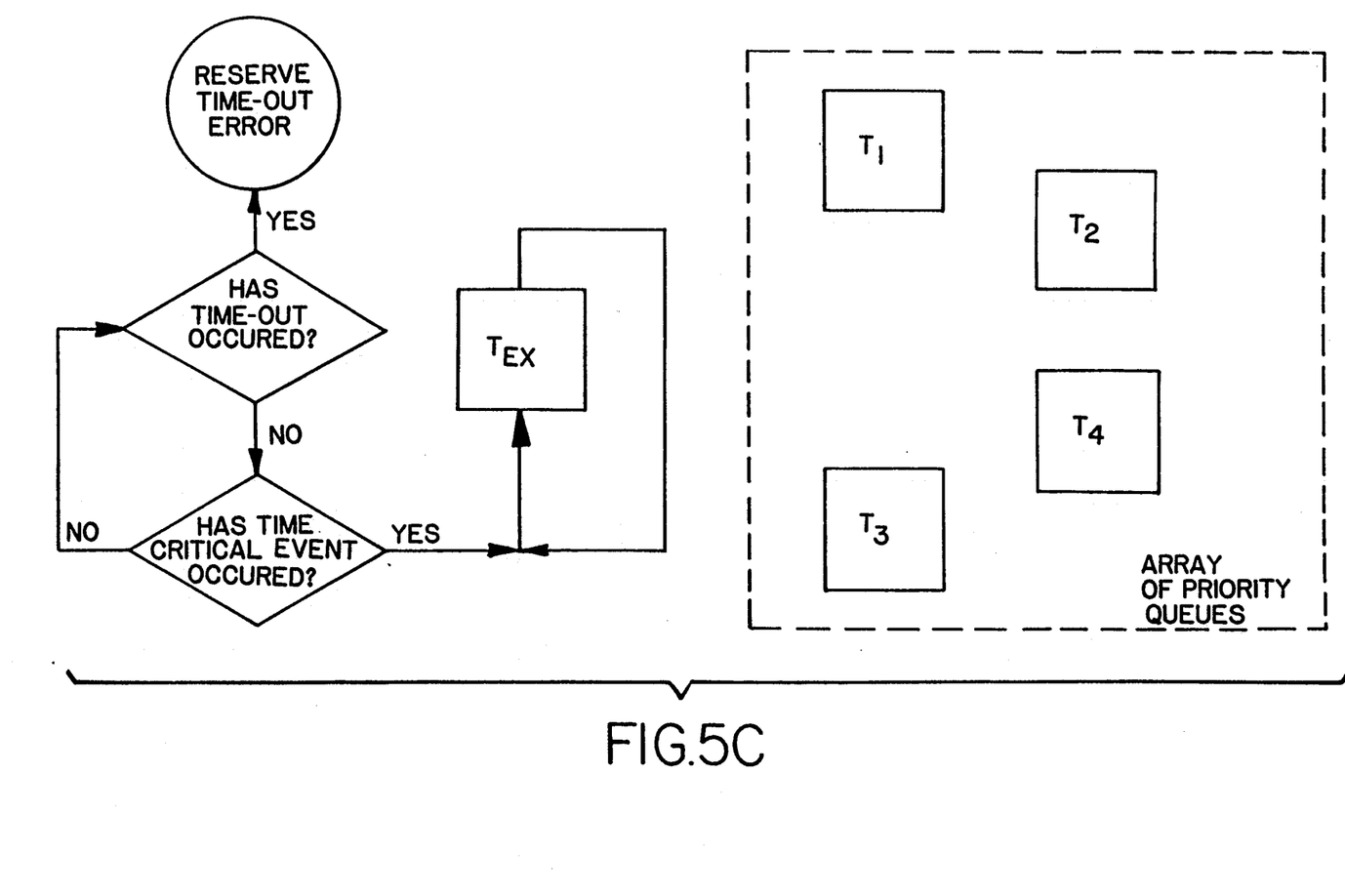

The reserved-resources operational mode as shown in FIG. 5(c) is provided when quick response to an expected event is required. FVOS waits for an event to occur; when the event occurs, the reserved task is executed until a "done" or "unlock" function is encountered, which returns FVOS to normal operational mode. If the event does not occur within the specified time out period (supplied by the user), then an error is flagged by the task scheduler. In on embodiment of the invention, 8 separate interrupts can signal the occurrence of the event. These can be either timed interrupts, or interrupts based upon stimulus (such as pushing a button) from outside of the FVOS system. FVOS determines whether or not to go into the reserved-resources operational mode, or any of its operational modes, bY searching through the array of priority queues and checking if a task or subtask requires resources to be reserved.

Time Lines

The operation of FVOS is divided into two groups: the task scheduler, which executes between execution of each task segment, and the task creation and synchronization module, which is driven by the programmable timer interrupt and executed every 10 msecs. The functional flow of the task scheduler is shown in FIG. 6.

Figure 6:
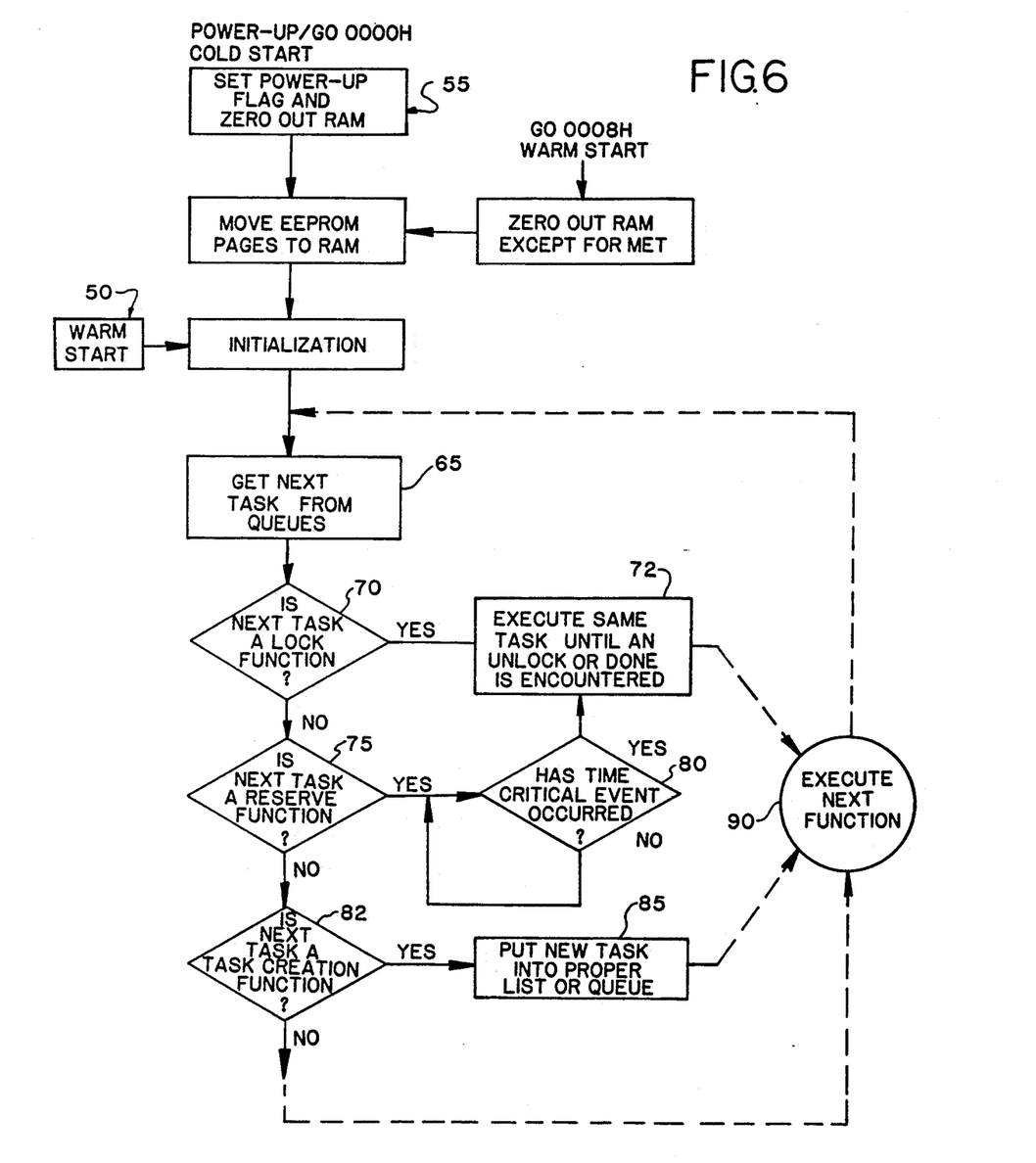
FIG. 6 is a functional flow chart showing the FVOS Task Scheduler Functional Flow.

Referring now to FIG. 6, note that FVOS has two entry points: a warm start location 50 and a cold start location 55. The primary difference between the two functions is that a warm start does not reset the MET but the cold start does. Also, a cold start evaluates its source of entry (i.e., go to 0000H or power up) and sets the power up status flag accordingly.

The task scheduler decides which task is to be executed next, based on the current FVOS operating mode. The frequency of execution for the task scheduler is once for every function that is executed.

Still referring to FIG. 6, after initialization 52, the task scheduler operates in loop 60 beginning at activity 65 which is means for obtaining the next task from the priority queues. Next, the task scheduler goes through decision means 70 to determine whether the next task is a lock function. If the task is a lock function, the task is executed element-by-element without evaluating the queue by execution means 72 until an unlock or done element is encountered. Following that same functional line, when the unlock or done is encountered at execution means 72, the task scheduler executes the next function or subtask or, if done, goes to the box 65 to obtain the next task from the queues. If at decision means 70 the next task is not a lock function, the task scheduler functionally proceeds to decision means 75 to determine whether or not the task is a reserved function. If the task is a reserved function, the task scheduler goes into decision means 80 to determine whether or not a time critical event has occurred at which time the function will be executed in box 72.

If the next task is not a reserved function, decision means 82 is entered wherein the task scheduler determines whether or not the next task is a task creation function. If it is, the new task is put into the proper list or queue pursuant to functional box 85 which then enters execute next function means 90. If the next task is not a task creation function, the task scheduler checks for a done subtask and puts the next function in the proper list or queue.

Figure 7:
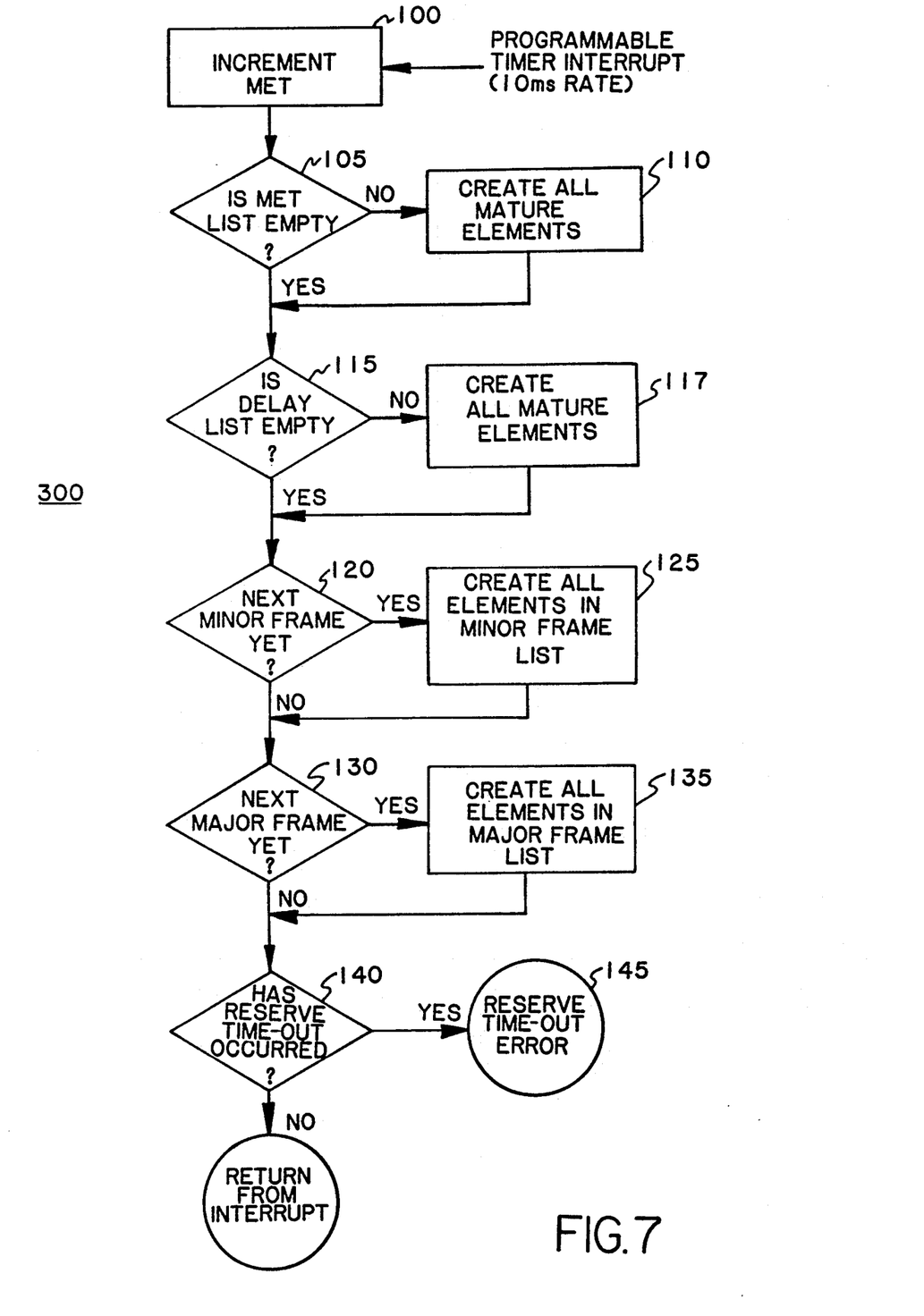
FIG. 7 is a functional flow chart showing the FVOS Task Creation and Synchronization Functional Flow.
Figure 8A:
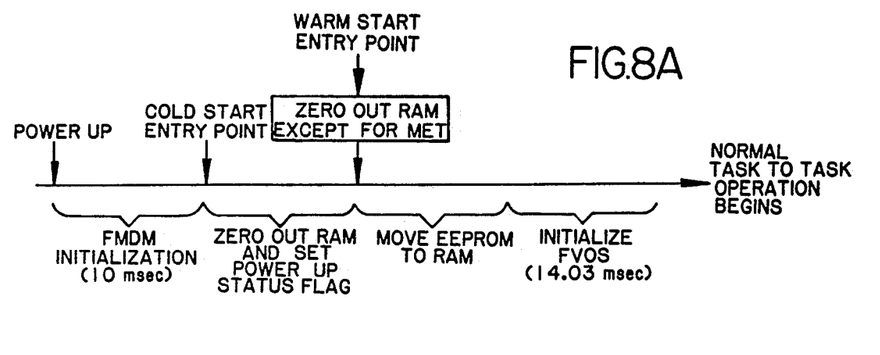
FIGS. 8A-8D illustrate FVOS Operational Mode Time Lines.
Figure 8B:
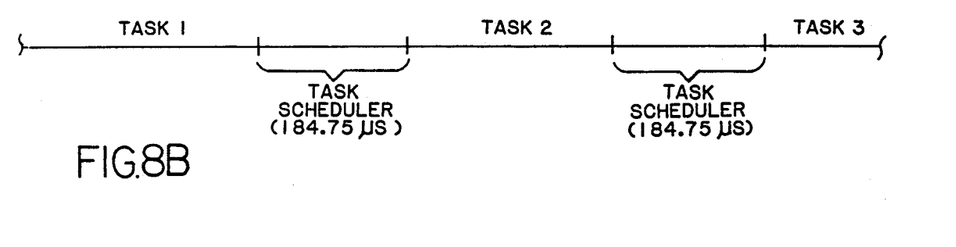
Figure 8C:
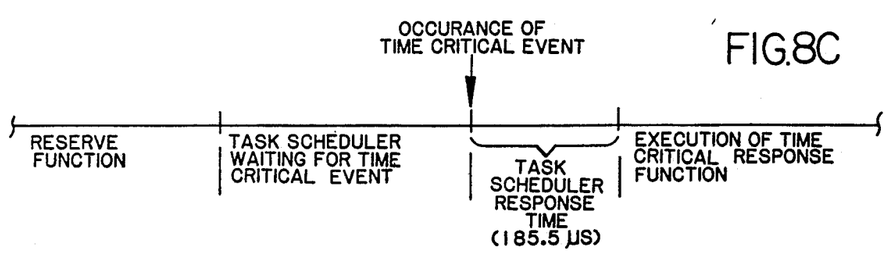
Figure 8D:
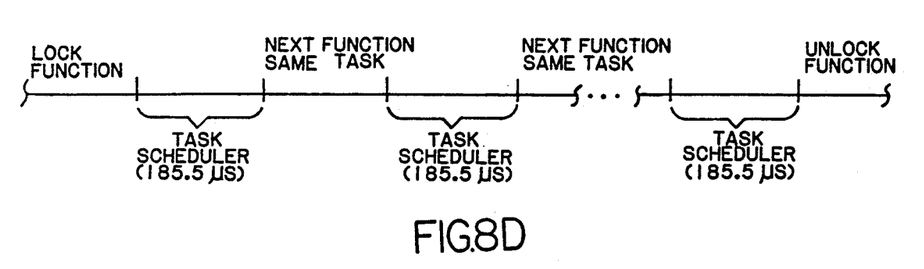

Now referring to FIG. 7, the task creation and synchronization module 300 is shown in the form of a functional flow diagram. The task creation and synchronization foreground functional flow keeps track of time, adds tasks to the priority queue based on MET, and performs various housekeeping functions. This module is entered once for every programmable timer interrupt, which FVOS initializes to a 10-msec rate. Task creation functions within this module are conditional based on MET, minor-frame timing, and major-frame timing. Each user application has minor and major time frames associated with it. Minor frames refer to minor time frames as used herein and are the number of 10-msec system ticks from 1 to 256. A major frame refers to a major time frame as used herein and is comprised of a number of minor frames from 1 to 256. Major frames and minor frames can be thought of as fast inner loops and slower outer loops in terms of program functional flow, respectively. The user can define the number of major and minor frames to suit the users application needs.

Referring again to FIG. 7, the task creation and synchronization module enters the functional flow at functional clock 100 where the MET is incremented by 10 milliseconds. Decision means 105 queries the MET list and if the list contains mature tasks, the first element of these tasks are added to the priority queues at functional block 110. In the nomenclature of FVOS "create all mature elements" means to add those subtasks to the priority queues which have "matured" (i.e., those elements which are ready for execution). If the MET list is empty or if all mature elements have been created, the module then enters the decision means 115 and checks the delay list for elements. The delay for each item in the delay list is decremented by 10 msec. When delay is equal to zero, elements in the delay list are "mature" and are added to the list in functional block 120. If the delay list is empty or if all mature elements have been created, the module functionally executes the next decision means 120 to query whether or not the next minor frame is beginning. If the next minor frame is beginning, then all elements in the minor frame list are created in functional block 125. If a next minor frame is not beginning or if all elements have been created, the module proceeds to decision means 130 to check if the next major frame is beginning and, if so, it creates all elements in the major frame list at functional block 135. Finally, the module checks to see if a reserved time out has occurred at decision means 140. The decision time out is a safety feature wherein if resources have been reserved, a time limit is set by the user for reservation of those resources while awaiting a time critical event. If the reserve time out occurs before the time critical event occurs, a reserve time out error is sent at point 145. If no reserve time out has occurred, the FVOS returns from the interrupt back into the task scheduler module.

FIG. 8 illustrates calculated time lines for FVOS initialization and each of the three operational modes. Following FVOS initialization, one of the three operational modes is entered. Required context switching times for each operational mode is also shown in FIG. 8.

Note that the times in FIG. 8 are calculated based on only one element in the highest-priority queue, which is an almost ideal situation. Numerous situations can exist depending on the current status of each major task and the arrangement of elements in the priority queue. For purposes of estimating context-switching times, the following variations are applied to the time lines of FIG. 8 to satisfy each special situation. In the following variations, the task segment which the task scheduler chooses to execute is referred to as the task segment of interest.

1. If the previous task segment is the last segment of that task, add 43.5 microseconds to the task scheduler execution time.

2. If the task segment of interest is an I/O or APU function, add 10 percent to the task scheduler execution time.

3. If the task segment of interest is not the highest priority level, add 16.5 microseconds for each priority level below the highest priority level.

4. If an I/O or APU function is currently coprocessing and is of a higher priority than the task segment of interest, add 61.25 microseconds for each of the I/O or APU functions.

Interrupts

In one embodiment of the invention as used with an FMDM, the FMDM interrupt structure is Z80 interrupt mode 2. There are 9 FMDM interrupts organized in a priority fashion. The APU interrupt, IOM disable interrupt, programmable timer interrupt, and IOM transfer completed ("done") interrupt are transparent to the user, while IOM number zero interrupt, flexible interrupt, external interrupt, error interrupt, and non-maskable interrupt are user defined. The non-maskable interrupt (NMI) occurs upon the loss of power to the FMDM. The NMI service routine prepares for and executes a graceful power down sequence.

The IOM transfer complete (done) interrupt occurs following every input/output transfer and signals that the I/O transfer has completed and data is available at the I/O controller (another I/O transfer can now occur). This interrupt is transparent to the user and is completely serviced by FVOS.

As one skilled in the art will readily recognize, there are many potential uses for the operating system of the invention. One possible use would be to control a materials processing experiment wherein sensors would provide inputs to the operating system related to certain tasks, those tasks would be prioritized and executed by the operating system and the operating system would output signals to control means for operating specified functions. For example, a user of the system could operate an experiment to grow crystals. The user would start with an appropriate liquid solution which would grow crystals under the right environmental conditions. The operating system would wait for the user to initiate the process, as by pushing a button. The operating system would then receive inputs from a number of sensors in parallel and perhaps operate multiple crystal growing experiments in parallel, while using one controller.

One possible scenario would be where the operating system would command a vacuum chamber to evacuate after the liquid solution had been input into the vacuum chamber. The operating system would then monitor the pressure within the vacuum chamber by receiving inputs from pressure sensors inside the vacuum chamber. When the vacuum chamber reached a certain pressure, for example, $10^{-8}$ TOR, it would then start a heater which would ramp up at a controlled rate of ascent. The operating system, through inputs from the outside sensors, would continuously monitor the temperature inside of the vacuum chamber. At the same time, it would provide for adjusting the temperature via a control means responding to the temperature measurements. A third sensor could measure the weight of the crystal and when it arrived at a predetermined weight, the above process would be reversed, returning the chamber to normal atmospheric and room temperatures.

Another possible application for this operating system would be to attach it to sensors within a building The sensors could operate the environmental controls within the building including heating and air-conditioning. It would be possible, using this operating system, to perform many other tasks at the same time, such as using the MET function to turn lights on and off. A function such as turning the lights in a building on and off would be more of a "major frame" task, or an outer loop task since it can be done over long periods of time and does not require split second timing.

Figure 9:
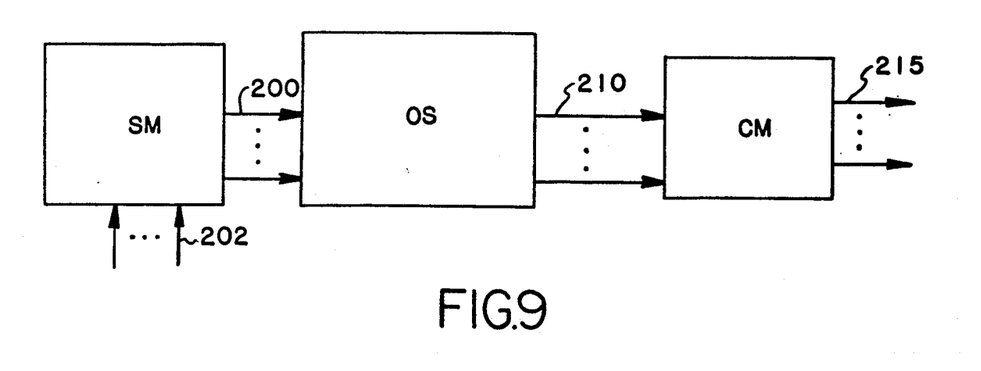
FIG. 9 shows a schematic diagram of a possible control system configuration utilizing the operating system of the invention

FIG. 9 shows a control system using the operating system of the invention including sensing means SM, the operating system OS, and control means CM. The sensing means SM comprises a plurality of sensors having a plurality of outputs 200 and a plurality of inputs 202. The operating system has inputs and outputs corresponding to the stimulus received from the sensing means which would result in tasks being performed and sending signals in the form of electronic voltages via the outputs of the operating system 210 to the inputs of the control means. Control means CM has outputs 215 which carry a control signal to an external device. Of course, it is not necessary to have a plurality of inputs and outputs, but it makes the most efficient use of the operating system. The operating system could work with a single sensor and a single controller in a given circumstance.

While there has been shown and described a preferred embodiment of the invention, those skilled in the art will appreciate that various changes and modifications may be made to the illustrated embodiment without departing form the true spirit and scope of the invention which is to be determined from the appended claims.

TABLE 1.0

FVOS FUNCTION SUMMARY

| FUNCTION NAME | EXECUTED BY | | | DESCRIPTION |
| --- | --- | --- | --- | --- |
| | CPU | IOP | APU | |
| RUN | X | | | RUN APPLICATION MODULE |
| CALCULATE | | | X | PERFORM CALCULATION EQUATION |
| INPUT | | X | | INPUT DATA FROM AN I/O MODULE |
| OUTPUT | | X | | OUTPUT DATA TO AN I/O MODULE |
| ECHO | | X | | ECHO DATA FROM AN I/O MODULE TO AN I/O MODULE |
| CT-DELAY | X | | | CREATE A TASK AFTER A DELAY TIMEOUT |
| CT-MAJOR | X | | | CREATE A TASK AT NEXT MAJOR TIMING FRAME |
| CT-MET | X | | | CREATE A TASK AT NEXT MINOR TIMING FRAME |
| INQUIRE | X | | | CREATE A TASK AT MISSION ELAPSED TIME |
| BITE | X | X | | PERFORM BUILT-IN TESTS |
| JUMP | X | | | CONDITIONAL JUMP |
| LOCK | X | | | OVERRIDE PRIORITY-EXECUTE ONE TASK |
| UNLOCK | X | | | INVERSE OF LOCK |
| LOAD | | | | LOAD DATA FROM RAM TO EEPROM |
| RESERVE | X | | | RESERVE I/O RESOURCE FOR TIME CRITICAL EVENT |
| PUTC | X | | | PUT CHARACTER TO RS-232C |
| GETC | | | | GET CHARACTER FROM RS-232C |
| IOC | X | | | CONTROL HEARTBEAT CONTROLLER |
| MASK | | X | | CHANGE INTERRUPT STRUCTURE |
| MRESET | | X | | RESET ALL FMDM HARDWARE |
| PROG | X | | | PROGRAM EEPROMS |
| SETIME | X | | | SET THE FMDM MISSION ELAPSED TIME REFERENCE |

TABLE 2
FVOS SOFTWARE MODULE FUNCTIONAL SUMMARY

| SOFTWARE MODULE TYPE | MNEMONIC | NAME | FUNCTION (SEE NOTE) |
|---|---|---|---|
| Interrupt Handler | TSK_CS | Programmable Timer Interrupt | T |
| | NMI_SR | Non-Maskable Interrupt | U |
| | ONE_6 | IOM Disable Interrupt | D |
| | FLEXI | Flexible Interrupt | U |
| | DONEI | DONE Interrupt | IO |
| | APUI | APU Interrupt | A |
| | IOMI | IOM #0 Interrupt | IOU |
| | EXTI | External Interrupt | U |
| | ERRORI | Error Interrupt | UD |
| | MASK | Modify Interrupt Mask | U |
| Task Scheduler | TS | Task Scheduler | T |
| Task Creation | CT_DLY | Create task after a delay | T |
| Functions | CT_MET | Create task at Mission Elapsed Time | T |
| | CT_MAJ | Create task at major frame | T |
| | CT_MIN | Create task at minor frame | T |
| Arithmetic Functions | CALC | "Calculate" function | A |
| Input/Output Functions | INPUT | Input function | I |
| | OUTPUT | Output function | O |
| | ECHO | Echo input to output | IO |
| | PUTC | Put character to RS-232 port | O |
| | GETC | Get character from RS-232 port | I |
| | MRESET | Master reset individual IOMs | IO |
| Priority Override Functions | LOCK | "Lock" function | T |
| | UNLOCK | "Unlock" function | T |
| | RESERV | Reserve processing resources | T |
| EEPROM Functions | LOAD | Load program from EEPROM to RAM | U |
| | PROG | Program EEPROM | U |
| Conditional | JMP_Z | Jump on zero | T |
| | JMP_NZ | Jump on not zero | T |
| | JMP_P | Jump on positive | T |
| | JMP_N | Jump on negative | T |
| | JUMP | Jump always | T |
| Built-In Test Functions | BITEPS | Power Supply BITE | D |
| | BITEMM | Memory Module BITE | D |
| | BITECPU | CPU Module BITE | D |
| | BITEAPU | APU Module BITE | D |
| | BITEIO | I/O Module BITE | D |
| Miscellaneous Functions | RUN | Run an application module | U |
| | SETIME | Set FMDM elapsed time | T |
| | INQUIRE | Status inquiry function | D |
| | INIT | Initialize FVOS | T |
| | PWRUP | Put power-up status to pointer | D |
| | BSR | Put BITE status register to pointer | D |
| | LOAD_B | Load memory byte with value | U |
| | LOAD_W | Load memory word with value | U |
| | RDERR | Read error register and put to pointer | D |
| | IOC | Turn the IO Controller on, off, or to obtain status | IO |

NOTES:
I = INPUT,
O = OUTPUT,
T = TASK COORDINATION,
D = DIAGNOSTICS,
U = USER-DEFINED,
A = ARITHMETIC

TABLE 10
FVOS INTERRUPT SUMMARY

| INTERRUPT | PRIORITY | SOURCE | OCCURRANCE | RESPONSE |
|---|---|---|---|---|
| APU | Lowest | Arithmetic Processing Unit | Once for every APU command | Continue calculations or get result |
| IOM #0 | | IOM #0 | User-defined | User-defined |
| IOM DISABLE | | 1.6-second BITE timer | Every 1.6 seconds | Create a task that resets IOM Disable timer |
| EXTERNAL | | User experiment external to FMDM | User-defined | User-defined |
| FI | | User-defined (FMDM slot #11) | User-defined | User-defined |
| ERROR | | Error register | Upon error conditions | User-defined |

TABLE 10-continued

| | | FVOS INTERRUPT SUMMARY | | |
|---|---|---|---|---|
| INTERRUPT | PRIORITY | SOURCE | OCCURRANCE | RESPONSE |
| PROG. TIMER | | Programmable Timer | Every 10 msec | Task creation and synchronization module |
| DONE | | IOM transfer completed | Once for every input/output | Get input and/or set IOM status to not busy |
| NMI | Highest | Power Supply hardware | Upon loss of power | User-defined (preparation for power loss) |

The embodiments of the invention in which an exclusive property or right is claimed are defined as follows:

1. A task scheduler system, including an array of priority queues for use in a real time multitasking operating system including equation lists, configuration lists, a function library, input and output drivers, user-created task definition lists of major and minor tasks, including major and minor task elements, and interrupt handlers, initialized to have programmable timer interrupts, comprising:
 (a) means for task scheduling according to priority wherein upon the completion of each library function the priority queues are interrogated and the highest priority task segment is found whose requested resource is available and executed and wherein task segments in the same priority queue are executed in round-robin fashion,
 and wherein the task scheduling means further includes means for maintaining the status of all major tasks in the system in the states of unlocked and done, unlocked and active, unlocked and waiting, locked and active, or locked and waiting including means for locking tasks into a mode of operation so as to only allow the locked task to execute overriding the normal state of priority execution, and wherein the task scheduling means still further includes waiting means for suspending operation on a task that requires completion of a library function; and
 (b) means for task creation responsive to programmable timer interrupts including means for interrogating the task definition lists and means for creating all major and minor task elements from the task definition lists so as to create major and minor tasks which are added to the priority queues.

2. The system of claim 1 wherein the array of priority queues comprise eight queues.

3. The system of claim 1 wherein the number of task definition lists is a maximum of 128.

4. A method of scheduling tasks included in an array of priority queues for use in a real time multitasking operating system, including equation lists, configuration lists, a function library, input and output drivers, user-created task definition lists of major and minor tasks, including major and minor task elements, and interrupt handlers, initialized to have programmable timer interrupts comprising the steps of:
 (a) task scheduling according to priority wherein upon the completion of each library function the priority queues are interrogated and the highest priority task segment is found whose requested resource is available and executed and wherein task segments in the same priority queue are executed in round-robin fashion and where the task scheduling further includes the steps of
 maintaining the status of all major task in a system of the states of unlocked and done, unlocked and active, unlocked and waiting, locked and active, or locked and waiting including locking tasks into a mode of operation so as to only execute the locked task and override the normal state of priority execution, and waiting for suspending operation on a task that requires completion of a library function; and
 (b) creating tasks in response to the programmable timer interrupts including the steps of interrogating the task definition lists and creating all major and minor task elements form the task definition lists so as to create major and minor tasks.

5. The method of claim 4 further including the step of reserving resources for response to the occurrence of a time critical event.

* * * * *